United States Patent [19]

Chambers et al.

[11] Patent Number: 4,836,708

[45] Date of Patent: Jun. 6, 1989

[54] SELF-LOCKING, ANTI-ROTATIONAL RETAINING WASHER FOR A "D" SHAPED SHAFT

[75] Inventors: Randall P. Chambers, Fort Lauderdale; John C. Dzung, Sunrise; Donald F. Gatto, Coral Springs, all of Fla.

[73] Assignee: Motorola, Inc., Schaumburg, Ill.

[21] Appl. No.: 214,988

[22] Filed: Jul. 5, 1988

[51] Int. Cl.⁴ .............................................. B25G 3/28
[52] U.S. Cl. ..................... 403/358; 403/259; 411/546; 74/553
[58] Field of Search ............. 403/357, 259, 356, 358; 411/546, 547, 521; 74/553, 548

[56] References Cited

U.S. PATENT DOCUMENTS

| | | | |
|---|---|---|---|
| 1,194,426 | 8/1916 | Richey | 411/521 X |
| 2,625,054 | 1/1953 | Bauman | 74/553 |
| 2,733,942 | 2/1956 | Palmer | 74/548 |
| 2,880,641 | 4/1959 | Sislik | 411/521 |
| 3,154,051 | 10/1964 | Durst et al. | 74/553 U X |
| 3,558,165 | 1/1971 | Lundergan | 74/553 X |

Primary Examiner—Andrew V. Kundrat
Attorney, Agent, or Firm—Martin J. McKinley; Daniel K. Nichols

[57] ABSTRACT

A retaining washer (100) prevents the rotation of a D-shaped shaft (106) which is mounted in a round hole (105a) of a housing (105). The retaining washer includes a substantially flat washer (101) having a hole (101a). A tapered tab (102) includes a wide end (102a) and a narrow end (102b). The tab is attached to the flat washer at the wide end such that the tab is substantially perpendicular to the flat washer. A gusset (103) is attached between the tab and the flat washer. The gusset includes a lower edge (103a) which is positioned at an obtuse angle (104) relative to the flat washer. The gusset indents into the housing (105b) and the tab is forced against the flat portion (106b) of the D-shaped shaft. The upper left and right edges of the tab cut into the wall of the housing hole (105c and 105d).

4 Claims, 2 Drawing Sheets

SELF-LOCKING, ANTI-ROTATIONAL RETAINING WASHER FOR A "D" SHAPED SHAFT

BACKGROUND OF THE INVENTION

This invention pertains to retaining washers and, more particularly, to a retaining washer that inhibits the rotation of a D-shaped shaft in a round hole.

To prevent the rotation of a shaft which is mounted within a hole in a housing, both the cross-section of the shaft and the housing hole are frequently D-shaped. There are many applications, however, wherein a D-shaped shaft must be mounted within a round hole while still preventing the rotation of the shaft within the hole. Accordingly, the invention described below prevents the rotation of a D-shaped shaft within a round hole.

SUMMARY OF THE INVENTION

Briefly, the invention is a retaining washer that includes a substantially flat washer with a hole and a tapered tab with wide and narrow ends. The tapered tab is connected to the flat washer at the wide end of the tab such that the tab is substantially perpendicular to the flat washer. A gusset is connected between the tab and the flat washer. The gusset has an edge that forms an obtuse angle with the flat washer.

In another embodiment, the invention is an assembly that includes the retaining washer described above. Also included is a housing with a hole and a shaft with a D-shaped cross section. The shaft is inserted through the holes in the housing and the flat washer. The tab of the retaining washer is inserted into the housing hole such that the edges of the tab cut into the wall of the housing hole. The gusset indents into the wall of the housing hole forcing the tab against the flat portion of the shaft. This inhibits the rotation of the shaft within the housing hole.

DESCRIPTION OF THE PREFERRED EMBODIMENT

Figure 1:
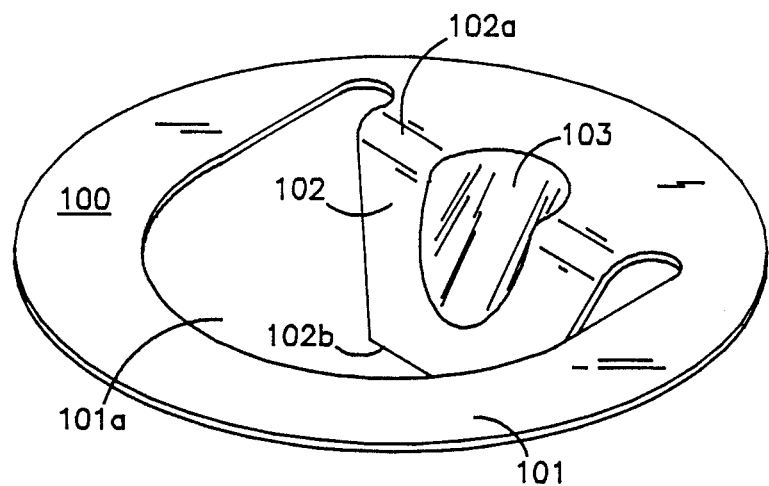
FIG. 1 is a perspective view of the retaining washer.
Figure 2:
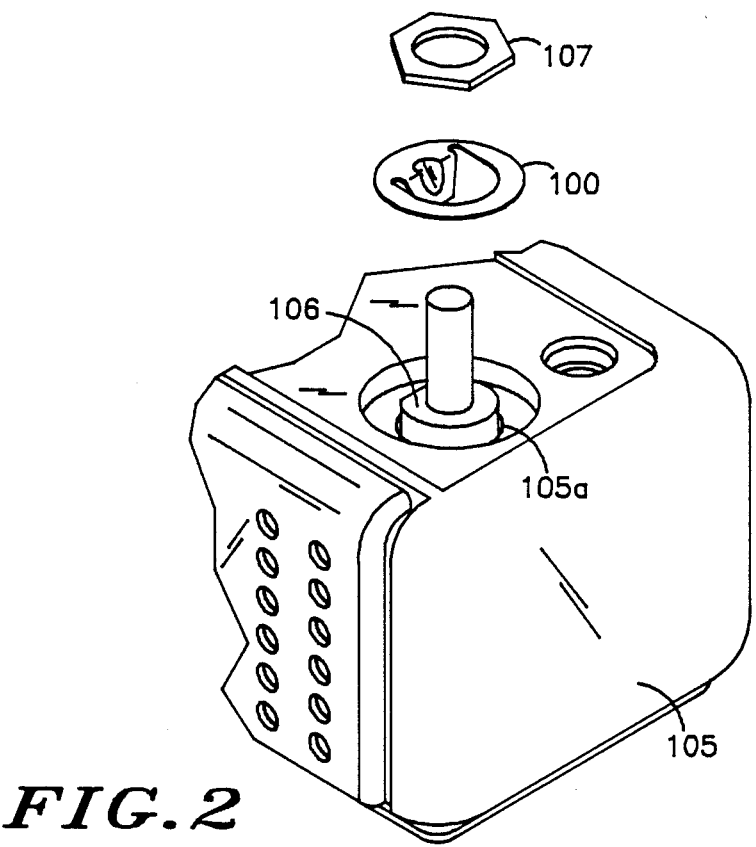
FIG. 2 is an exploded perspective view of an assembly that includes a housing, a D-shaped shaft and the retaining washer.
Figure 3:
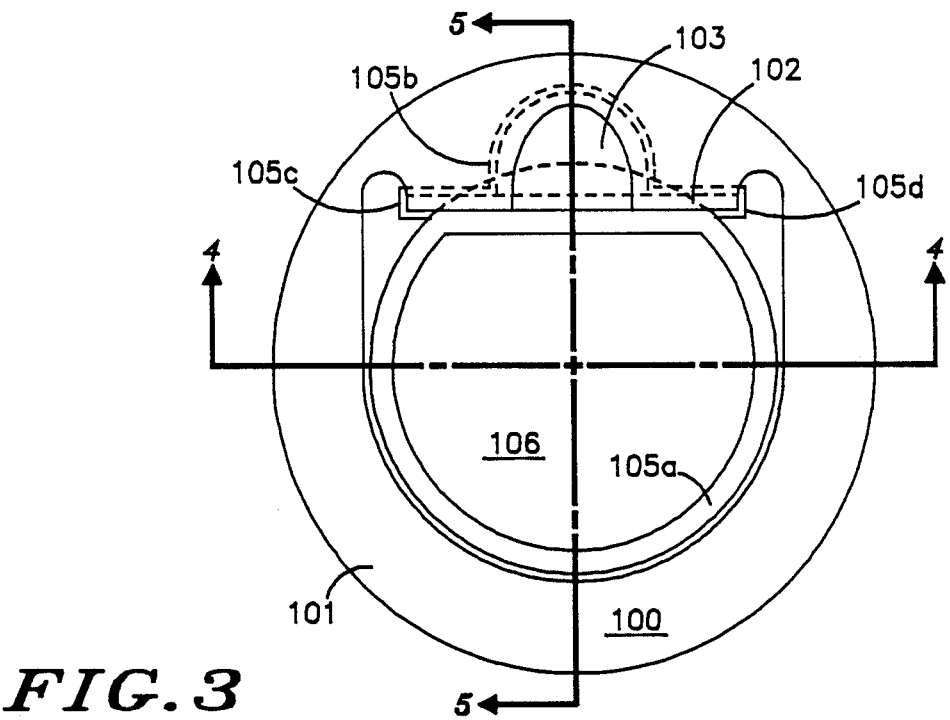
FIG. 3 is a top view of the retaining washer and housing with a D-shaped shaft inserted through the holes in the housing and washer.
Figure 4:
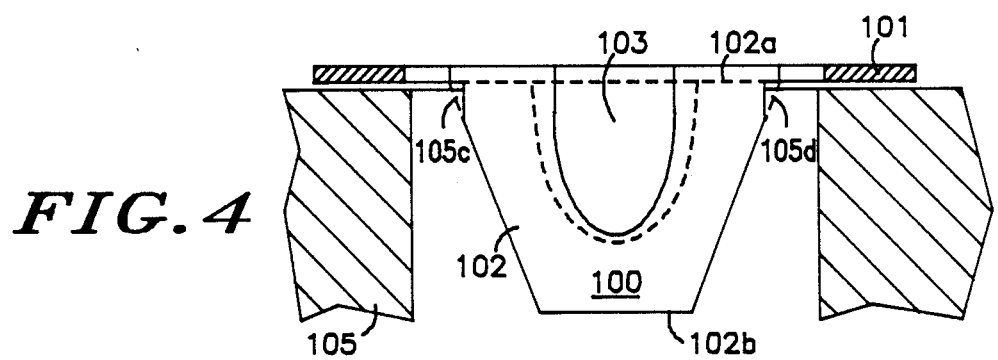
FIG. 4 is a cross-sectional view of the retaining washer and housing as seen along line 4—4 of FIG. 3. The D-shaped shaft is not illustrated in FIG. 4.
Figure 5:
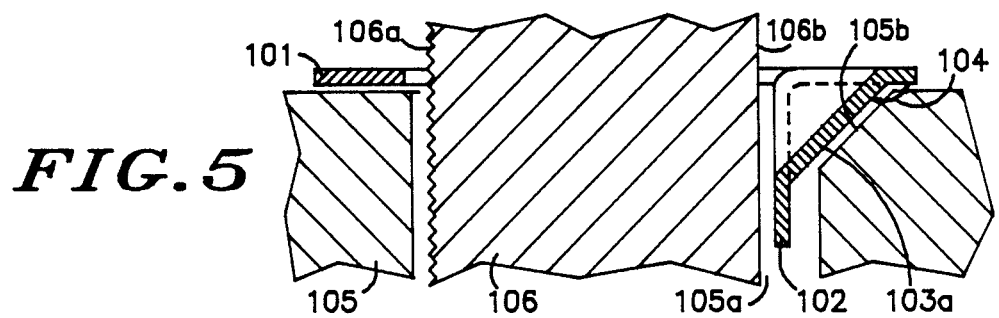
FIG. 5 is a cross-sectional view of the retaining washer, D-shaped shaft and housing as seen along line 5—5 of FIG. 3.

Referring to FIGS. 1 and 3-5, a retaining washer 100 includes a substantially flat washer 101 having a hole 101a suitable for accepting a shaft. A tapered tab 102 includes a wide end 102a and a narrow end 102b. Tab 102 is connected to flat washer 101 at the wide end 102a of the tab such that the tab is substantially perpendicular to the flat washer. A gusset 103 is connected between tab 102 and flat washer 101. One of the functions of gusset 103 is to provide support for tab 102. As illustrated in FIG. 5, gusset 103 includes a lower edge 103a that forms an obtuse angle 104 (preferably 127°) with flat washer 101 (more specifically, the lower surface of the flat washer). Retaining washer 100 is preferably manufactured by stamping. Stainless steel is the preferred material.

An assembly that includes the retaining washer, a housing and a D-shaped shaft is illustrated if FIGS. 2-5. Referring to these figures, a housing 105 includes a hole 105a. A shaft 106 having a D-shaped cross section is inserted through housing hole 105a. Retaining washer 100 is placed over shaft 106 such that tab 102 is inserted into housing hole 105a. Shaft 106 preferably includes threads 106a such that a nut 107 can be threaded over the shaft to secure the shaft within housing hole 105a. Other well known devices for securing a shaft within a hole are also suitable.

Shaft 106 includes a non-illustrated enlargement such that the shaft will not pull completely through housing hole 105a as nut 107 is tightened around the shaft. Housing 105 is constructed from a deformable material, such as plastic, such that gusset 103 indents into the wall of the housing hole at 105b as nut 107 is tightened. The positioning of the lower edge 103a of the gusset at obtuse angle 104 causes tab 102 to be forced against the flat portion 106b of the shaft. In addition, the upper portion of the left and right edges of tab 102 cut into the wall of housing hole 105a at 105c and 105d. The force of tab 102 against the flat portion 106b of the shaft, the indentation 105b of the gusset into the housing, and cuts 105c and 105d all contribute to inhibit the rotation of the shaft within the housing hole.

Although the preferred application for retaining washer 100 is to secure a D-shaped shaft within a round housing hole, the retaining washer can be used with other hole shapes and with shafts that have cross-sections that are not D-shaped. If the cross-section of the shaft is other than D-shaped, it should at least include a flat portion or other suitably shaped surface that will engage tab 102 to prevent the rotation of the shaft within the hole. The term "housing" refers to the device that includes the hole in which the shaft is mounted, and housing 105 can be complex in shape, such as the one illustrated in FIG. 2, or very simple in shape, such as a flat plate.

We claim as our invention:

1. An assembly comprising in combination:
   a housing having a hole, providing a wall;
   a shaft inserted through the hole of said housing, said shaft having a substantially D-shaped cross section providing a flat portion; and
   a retaining washer including:
   a substantially flat washer having a hole;
   a tab being connected to said flat washer such that said tab is substantially perpendicular to said flat washer; and
   a gusset connected between said tab and said flat washer, said gusset having an edge, said edge forming an obtuse angle with said flat washer;
   said shafts being inserted into the hole of said flat washer, and said tab being inserted into the hole of said housing with said gusset being indented into the wall of said housing such that said tab is forced against the flat portion of said D-shaped shaft, thereby inhibiting rotation of said shaft within the hole of said housing.

2. An assembly, comprising in combination:
   a housing having a hole providing a wall;

a shaft inserted through the hole of said housing, said shaft having a flat portion providing, a substantially D-shaped cross section;

and a retaining washer including a substantially flat washer having a hole, a tapered tab having a wide end and a narrow end, and a gusset connected between said tab and said flat washer, said tab being connected to said flat washer at said wide end such that said tab is substantially perpendicular to said flat washer, said gusset having an edge, said edge forming an obtuse angle with said flat washer, said shaft being inserted into the hole of said flat washer, said tab being inserted int the hole of said housing such that the edges of said tab cut into the wall of the hole of said housing, said gusset being indented into the wall of said housing such that said tab is forced against the flat portion of said D-shaped shaft, thereby inhibiting rotation of said shaft within the hole of said housing.

3. An assembly as defined in claim 1, wherein the housing is plastic.

4. An assembly as defined in claim 2, wherein the housing is plastic.

* * * * *